United States Patent
Hui et al.

(10) Patent No.: US 10,396,970 B2
(45) Date of Patent: Aug. 27, 2019

(54) ADAPTIVE RELAY SCHEMES AND VIRTUAL FULL-DUPLEX RELAY OPERATION

(71) Applicant: TELEFONAKTIEBOLAGET LM ERICSSON (PUBL), Stockholm (SE)

(72) Inventors: Dennis Hui, Sunnyvale, CA (US); Ivana Maric, Stanford, CA (US); Songnam Hong, Yongin-Si (KR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 15/545,600

(22) PCT Filed: Jan. 22, 2016

(86) PCT No.: PCT/IB2016/050339
§ 371 (c)(1),
(2) Date: Jul. 21, 2017

(87) PCT Pub. No.: WO2016/116906
PCT Pub. Date: Jul. 28, 2016

(65) Prior Publication Data
US 2018/0006796 A1 Jan. 4, 2018

Related U.S. Application Data

(60) Provisional application No. 62/107,271, filed on Jan. 23, 2015.

(51) Int. Cl.
*H04L 5/14* (2006.01)
*H04L 5/16* (2006.01)
(Continued)

(52) U.S. Cl.
CPC ............ *H04L 5/1469* (2013.01); *H04B 7/15* (2013.01); *H04B 7/15528* (2013.01); *H04L 5/16* (2013.01); *H04L 1/0077* (2013.01); *H04W 88/04* (2013.01)

(58) Field of Classification Search
CPC ....... H04L 5/1469; H04L 5/16; H04L 1/0077; H04B 7/15; H04B 7/14; H04B 7/15528; H04W 88/04
(Continued)

(56) References Cited

U.S. PATENT DOCUMENTS

2007/0043856 A1* 2/2007 Morris ................ H04L 67/2823
709/224
2007/0113146 A1* 5/2007 Li ........................ H03M 13/033
714/758

(Continued)

OTHER PUBLICATIONS

Duarte, Melissa, et al., "Full-Duplex Wireless Communications Using Off-The-Shelf Radios: Feasibility and First Results," Department of Electrical and Computer Engineering, Rice University, Houston, Texas; Nov. 2010.
(Continued)

*Primary Examiner* — Robert J Lopata

(57) ABSTRACT

A wireless communication system comprises a source node, a destination node, and a plurality of half-duplex relay nodes disposed between the source node and the destination node. The half-duplex relay nodes are configured in two disjoint paths each comprising an equal number of hops from the source node to the destination node. The source node is configured to alternately transmit information via the two disjoint paths in alternating time slots, and the destination node is configured to alternately receive information via the two disjoint paths in alternating time slots.

15 Claims, 8 Drawing Sheets

(51) Int. Cl.
*H04B 7/15* (2006.01)
*H04B 7/155* (2006.01)
*H04L 1/00* (2006.01)
*H04W 88/04* (2009.01)

(58) Field of Classification Search
USPC .......................................................... 370/280
See application file for complete search history.

(56) References Cited

U.S. PATENT DOCUMENTS

| | | | | |
|---|---|---|---|---|
| 2008/0317104 | A1* | 12/2008 | Akcaba | H04B 7/022 375/211 |
| 2011/0149835 | A1* | 6/2011 | Shimada | H04B 7/024 370/315 |
| 2011/0228742 | A1* | 9/2011 | Honkasalo | H04L 5/0007 370/330 |
| 2012/0127914 | A1* | 5/2012 | Tan | H04B 7/15592 370/315 |
| 2012/0184203 | A1* | 7/2012 | Tulino | H04W 52/244 455/7 |
| 2012/0201193 | A1* | 8/2012 | Sugiyama | H04B 7/155 370/315 |
| 2012/0236704 | A1* | 9/2012 | Tao | H04B 7/026 370/203 |
| 2012/0294202 | A1* | 11/2012 | Joung | H04B 7/2606 370/279 |
| 2013/0223257 | A1* | 8/2013 | Balercia | H04B 7/15557 370/252 |
| 2016/0182212 | A1* | 6/2016 | Zarifi | H04L 5/1438 370/336 |

OTHER PUBLICATIONS

Choi, Jung, et al., "Achieving Single Channel, Full Duplex Wireless Communication," Stanford University, California; Sep. 2010.

Rezaei, Seyed, et al., "Relay Scheduling in the Half-Duplex Gaussian Parallel Relay Channel," IEEE Transactions on Information Theory, IEEE Press, US, Jun. 1, 2010.

Jorgovanovic, et al., "Relay scheduling and interference cancellation for quantize-map-and-forward cooperative relaying;" 2013 IEEE International Symposium on Information Theory; Jul. 7, 2013.

Javad, et al., "Multi-layer Gelfand-Pinsker strategies for the generalised multiple-access channel," IET Communications, The Institution of Engineering and Technology, GB; May 22, 2014.

Sengupta, et al., "Cooperative Relaying at Finite SNR—Role of Quantize-Map-and-Forward," IEEE Transactions on Wireless Communications, vol. 13, No. 9, Sep. 2014.

\* cited by examiner

ADAPTIVE RELAY SCHEMES AND VIRTUAL FULL-DUPLEX RELAY OPERATION

CROSS-REFERENCE TO RELATED APPLICATIONS

This application is a national phase entry of PCT/IB2016/050339, filed Jan. 22, 2016, which claims the benefit of U.S. Provisional Application No. 62/107,271 filed on Jan. 23, 2015, the subject matter of which is hereby incorporated by reference in its entirety.

TECHNICAL FIELD

The disclosed subject matter relates generally to telecommunications, and more particularly to adaptive relay schemes and virtual full-duplex relay operation.

BACKGROUND

To cope with the exponential growth in wireless data traffic, it is anticipated that substantially denser deployment of base stations or wireless access nodes will be required in the future. The feasibility of a very dense deployment of wireless access nodes is predicated on the existence of a backhaul network that can provide high-data-rate transport for each individual access node in the network. From the point of view of maximizing capacity, optical-fiber-based backhaul solutions are probably the most desirable ones and are most suitable for new constructions. However, in existing buildings and infrastructure, the cost of installation of new fibers to every access node in a very dense network can be prohibitive.

An alternative to optical-fiber-based backhaul solutions is a wireless self-backhaul solution, where the same access spectrum is used to provide transport. With self-backhauling, an access node serves not only its own assigned user equipments (UEs) in its vicinity but also its neighboring access nodes as a relaying node in order to transfer data towards and/or from an information aggregation node in the network. A group of self-backhauling access nodes can form a multi-hop mesh network. Access nodes cooperatively transfer each other's traffic to and from the aggregation node.

SUMMARY

In certain embodiments of the disclosed subject matter, a wireless communication node comprises a processor and memory collectively encoding instructions that when executed by the processor, cause the wireless communication node to identify a current time slot as an odd time slot or an even time slot, and in response to identifying the current time slot as an odd time slot or an even time slot, transmit a source message to a corresponding odd-time relay group or an even-time relay group during the current time slot, wherein each of the odd-time relay group and the even-time relay group comprises a different set of half-duplex relay nodes disposed between the wireless communication node and a destination node.

In certain related embodiments, the instructions further cause the wireless communication node to generate a block of information bits as the source message, and in response to identifying the current time slot as an odd time slot or an even time slot, encode the block of information bits into a codeword, generate a modulated signal from the codeword, and transmit the modulated signal as the source message. In certain related embodiments, the block of information bits is encoded with a first or second coding rate according to whether the current time slot is an odd time slot or an even time slot. In certain related embodiments, the first and second coding rates are determined according to channel conditions in respective paths through the odd-time relay group and the even-time relay group.

In certain related embodiments, the relay nodes are Long-Term Evolution (LTE) relay nodes. In certain related embodiments, the relay nodes are part of a multi-hop backhaul network.

In certain related embodiments, the relay nodes are device-to-device (D2D) relay nodes.

In certain embodiments, a method of operating a wireless communication node comprises identifying a current time slot as an odd time slot or an even time slot, and in response to identifying the current time slot as an odd time slot or an even time slot, transmitting a source message to a corresponding odd-time relay group or an even-time relay group during the current time slot, wherein each of the odd-time relay group and the even-time relay group comprises a different set of half-duplex relay nodes disposed between the wireless communication node and a destination node.

In certain related embodiments, the method further comprises generating a block of information bits as the source message, and in response to identifying the current time slot as an odd time slot or an even time slot, encoding the block of information bits into a codeword, generating a modulated signal from the codeword, and transmitting the modulated signal as the source message. In certain related embodiments, the method further comprises encoding the block of information bits with a first or second coding rate according to whether the current time slot is an odd time slot or an even time slot. In certain related embodiments, the method further comprises determining the first and second coding rates according to channel conditions in respective paths through the odd-time relay group and the even-time relay group.

In certain embodiments, a wireless communication node comprises a processor and memory collectively encoding instructions that when executed by the processor, cause the wireless communication node to identify a current time slot as an odd time slot or an even time slot, and in response to identifying the current time slot as an odd time slot or an even time slot, receive a source message from a corresponding odd-time relay group or an even-time relay group during the current time slot, wherein each of the odd-time relay group and the even-time relay group comprises a different set of half-duplex relay nodes disposed between the wireless communication node and a source node that produced the source message.

In certain related embodiments, the instructions further cause the wireless communication node to perform interference cancellation on the received source message based on a previously decoded message. In certain related embodiments, the instructions further cause the wireless communication node to decode the received source message to generate information bits for an odd or even indexed block according to whether the current time slot is an odd time slot or an even time slot. In certain related embodiments, the source message is decoded with a first or second coding rate according to whether the current time slot is an odd time slot or an even time slot.

In certain embodiments, a method of operating a wireless communication node comprises identifying a current time slot as an odd time slot or an even time slot, and in response to identifying the current time slot as an odd time slot or an even time slot, receiving a source message from a corresponding odd-time relay group or an even-time relay group during the current time slot, wherein each of the odd-time relay group and the even-time relay group comprises a different set of half-duplex relay nodes disposed between the wireless communication node and a source node that produced the source message.

In certain related embodiments, the method further comprises performing interference cancellation on the received source message based on a previously decoded message. In certain related embodiments, the method further comprises decoding the received source message to generate information bits for an odd or even indexed block according to whether the current time slot is an odd time slot or an even time slot. In certain related embodiments, the source message is decoded with a first or second coding rate according to whether the current time slot is an odd time slot or an even time slot.

In certain embodiments, a half-duplex relay node comprises a processor and memory collectively encoding instructions that when executed by the processor, cause the half-duplex relay node to receive and transmit source messages in alternating receive and transmit time slots, respectively, wherein during each receive time slot, the half-duplex relay node receives a source message output by a source node in an odd time slot, in coordination with a companion half-duplex relay node transmitting a source message output by the source node in an adjacent even time slot, and during each transmit time slot, the half-duplex relay node transmits a source message output by the source node in an odd time slot, in coordination with the companion half-duplex relay node receiving a source message output by the source node in an adjacent even time slot.

In certain related embodiments, the instructions further cause the half-duplex relay node to, for each of the received source messages, adaptively select an encoding scheme and encode the source message according to the selected scheme. In certain related embodiments, adaptively selecting the encoding scheme comprises determining a channel quality value of a relay channel, and selecting one of multiple candidate encoding schemes according to the quality value. In certain related embodiments, the multiple candidate encoding schemes comprise a quantize-map-and-forward (QMF) encoding scheme and a decode-and-forward (DF) encoding scheme. In certain related embodiments, the DF encoding scheme is selected if the channel quality is greater than or equal to a predetermined value, else the QMF encoding scheme is selected.

In certain related embodiments, the selected encoding scheme is the QMF encoding scheme, and the instructions further cause the half-duplex relay node to determine whether to perform rate splitting to generate two or more codewords to represent a received source message. In certain related embodiments, the instructions further cause the half-duplex relay node to, in response to determining to perform rate splitting, quantize the received source message and generate two or more quantization indices, encode the quantization indices into two or more codewords, generate a modulated signal from the two or more codewords, and transmit the modulated signal.

In certain related embodiments, the instructions further cause the half-duplex relay node to, in response to determining not to perform rate splitting, quantize the received source message and generate a single quantization index, encode the quantization index into two or more codewords, generate a modulated signal from the codeword, and transmit the modulated signal.

In certain related embodiments, the selected encoding scheme is the DF encoding scheme, and the instructions further cause the half-duplex relay node to decode a source message to generate message information bits, and thereafter determine whether to perform rate splitting to generate two or more codewords to represent a received source message. In certain related embodiments, the instructions further cause the half-duplex relay node to, in response to determining to perform rate splitting, re-encode the message information bits into two or more codewords, generate a modulated signal from the two or more codewords, and transmit the modulated signal. In certain related embodiments, the instructions further cause the half-duplex relay node to, in response to determining not to perform rate splitting, re-encode the message information bits into a single codeword, generate a modulated signal from the codeword, and transmit the modulated signal.

In certain embodiments, a method of operating a half-duplex relay node comprises receiving and transmitting source messages in alternating receive and transmit time slots, respectively, wherein during each receive time slot, the half-duplex relay node receives a source message output by a source node in an odd time slot, in coordination with a companion half-duplex relay node transmitting a source message output by the source node in an adjacent even time slot, and during each transmit time slot, the half-duplex relay node transmits a source message output by the source node in an odd time slot, in coordination with the companion half-duplex relay node receiving a source message output by the source node in an adjacent even time slot.

In certain related embodiments, the method further comprises, for each of the received source messages, adaptively selecting an encoding scheme and encode the source message according to the selected scheme. In certain related embodiments, adaptively selecting the encoding scheme comprises determining a channel quality value of a relay channel, and selecting one of multiple candidate encoding schemes according to the quality value. In certain related embodiments, the multiple candidate encoding schemes comprise a quantize-map-and-forward (QMF) encoding scheme and a decode-and-forward (DF) encoding scheme. In certain related embodiments, the method further comprises selecting the DF encoding scheme if the channel quality is greater than or equal to a predetermined value, else selecting the QMF encoding scheme.

In certain related embodiments, the selected encoding scheme is the QMF encoding scheme, and the method further comprises determining whether to perform rate splitting to generate two or more codewords to represent a received source message. In certain related embodiments, the method further comprises, in response to determining to performing rate splitting, quantizing the received source message and generate two or more quantization indices, encoding the quantization indices into two or more codewords, generating a modulated signal from the two or more codewords, and transmitting the modulated signal. In certain related embodiments, the method further comprises, in response to determining not to perform rate splitting, quantizing the received source message and generating a single quantization index, encoding the quantization index into two or more codewords, generating a modulated signal from the codeword, and transmitting the modulated signal.

In certain related embodiments, the selected encoding scheme is the DF encoding scheme, and the method further comprises decoding a source message to generate message information bits, and thereafter determining whether to perform rate splitting to generate two or more codewords to represent a received source message. In certain related embodiments, the method further comprises, in response to determining to perform rate splitting, re-encoding the message information bits into two or more codewords, generating a modulated signal from the two or more codewords, and transmitting the modulated signal. In certain related embodiments, the method further comprises, in response to determining not to perform rate splitting, re-encoding the message information bits into a single codeword, generating a modulated signal from the codeword, and transmitting the modulated signal.

In certain related embodiments, a wireless communication system comprises a source node, a destination node, and a plurality of half-duplex relay nodes disposed between the source node and the destination node, wherein the plurality of half-duplex relay nodes are configured in two disjoint paths each comprising an equal number of hops from the source node to the destination node, and wherein the source node is configured to alternately transmit information via the two disjoint paths in alternating time slots.

In certain related embodiments, the source node is further configured to identify a current time slot as an odd time slot or an even time slot, and in response to identifying the current time slot as an odd time slot or an even time slot, transmit a source message to a corresponding odd-time relay group or an even-time relay group during the current time slot, wherein each of the odd-time relay group and the even-time relay group comprises a different subset of the half-duplex relay nodes.

In certain related embodiments, the destination node is configured to identify a current time slot as an odd time slot or an even time slot, and in response to identifying the current time slot as an odd time slot or an even time slot, receiving a source message from a corresponding odd-time relay group or an even-time relay group during the current time slot, wherein each of the odd-time relay group and the even-time relay group comprises a different subset of the half-duplex relay nodes.

In certain embodiments, a method of operating a network comprising a source node, a destination node, and a plurality of half-duplex relay nodes disposed between the source node and the destination node, comprises establishing multiple routes each comprising an equal number of hops from the source node to the destination node and each comprising a different subset of the half-duplex relay nodes, dividing the routes into an odd-time relay group and an even-time relay group, and alternately transmitting source messages from the source node through the odd-time relay group and the even-time relay group in successive odd and even time slots.

In certain related embodiments, the system further comprises the source node identifying a current time slot as an odd time slot or an even time slot, and in response to identifying the current time slot as an odd time slot or an even time slot, transmitting a source message to the odd-time relay group or the even-time relay group during the current time slot.

In certain related embodiments, the system further comprises the destination node identifying a current time slot as an odd time slot or an even time slot, and in response to identifying the current time slot as an odd time slot or an even time slot, receiving a source message from the odd-time relay group or the even-time relay group during the current time slot.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are provided as teaching examples and are not to be construed as limiting the scope of the disclosed subject matter. For example, certain details of the described embodiments may be modified, omitted, or expanded upon without departing from the scope of the described subject matter.

In general, the disclosed subject matter provides techniques and technologies capable of enhancing data throughputs in wireless networks. In certain embodiments this is accomplished through the use of adaptive relay schemes and virtual full-duplex relay operation.

In some embodiments of the disclosed subject matter, a multi-hop wireless backhaul network comprises a plurality of network nodes (or relays) in a plurality of routes of equal number of hops/stages through the wireless mesh network, the plurality of network nodes comprising a common starting network node for the route, a common ending network node for all the routes, and one or more intermediate network nodes between the starting network node and the ending network node in the route. The starting node may be configured to transmit to a first subset of routes in the odd time instances and to a second subset of routes in even time instances. The ending node may be configured to receive from the second subset of routes in odd time instances and from the first subset of routes in even time instances.

In certain related embodiments, the plurality of network nodes in the routes are further configured to exchange control signaling required to determine whether to decode and forward a message to the next stage or to quantize and forward a received signal to the next stage, and still further configured to determine whether to split the encoding of the decoded message or the quantized signal into two or more separate codewords with properly chosen rate for each codeword according to a certain criteria. Moreover, in some related embodiments, each node at any stage may decide to split the encoding if at least one node within the stage chooses to decode a message.

The described embodiments may be implemented in any appropriate type of communication system supporting any suitable communication standards and using any suitable components. As one example, certain embodiments may be implemented in an LTE network, such as that illustrated in FIG. 1. Other embodiments could be implemented in contexts other than those presented herein, e.g., in contexts using different radio access technologies (RATs).

Figure 1:
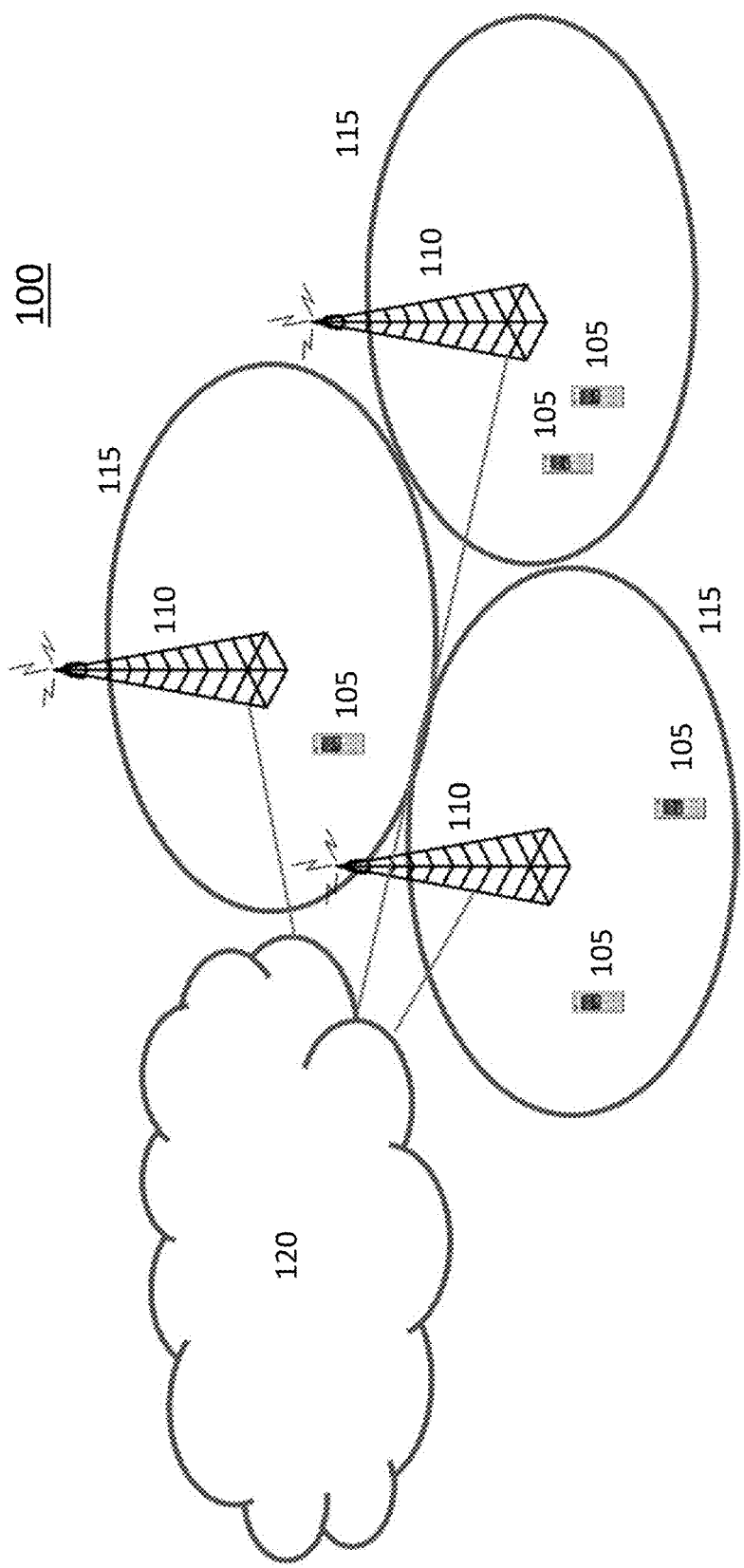
FIG. 1 is a diagram illustrating a long term evolution (LTE) network, in accordance with certain embodiments.

Referring to FIG. 1, a communication network 100 comprises a plurality of wireless communication devices 105 (e.g., conventional UEs, machine type communication [MTC]/machine-to-machine [M2M] UEs) and a plurality of radio access nodes 110 (e.g., eNodeBs or other base stations). Communication network 100 is organized into cells 115, which are connected to a core network 120 via corresponding to radio access nodes 110. Radio access nodes 110 are capable of communicating with wireless communication devices 105 along with any additional elements suitable to support communication between wireless communication devices or between a wireless communication device and another communication device (such as a landline telephone).

Wireless communication devices 105 and/or radio access nodes 110 may operate in coordination with relays (or repeaters), as will be apparent to those skilled in the art. Moreover, one or more of wireless communication devices 105 and/or radio access nodes 110 may be configured to operate as relays in certain contexts, as will also be apparent to those skilled in the art.

Figure 2:
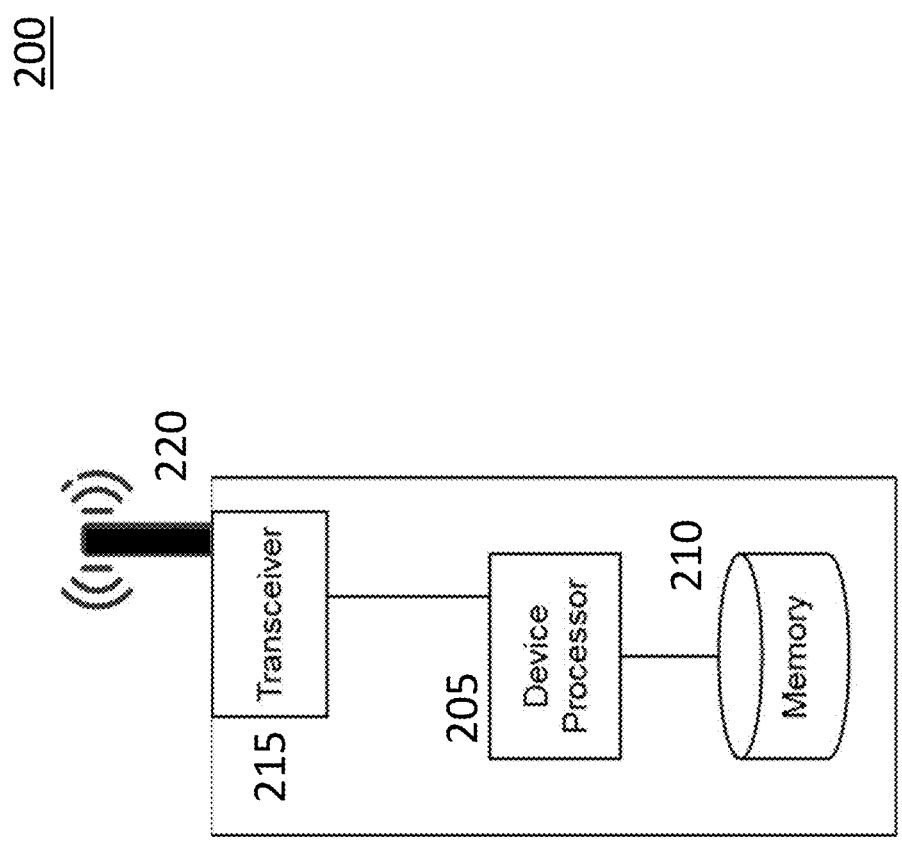
FIG. 2 is a diagram illustrating a wireless communication device, in accordance with certain embodiments.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
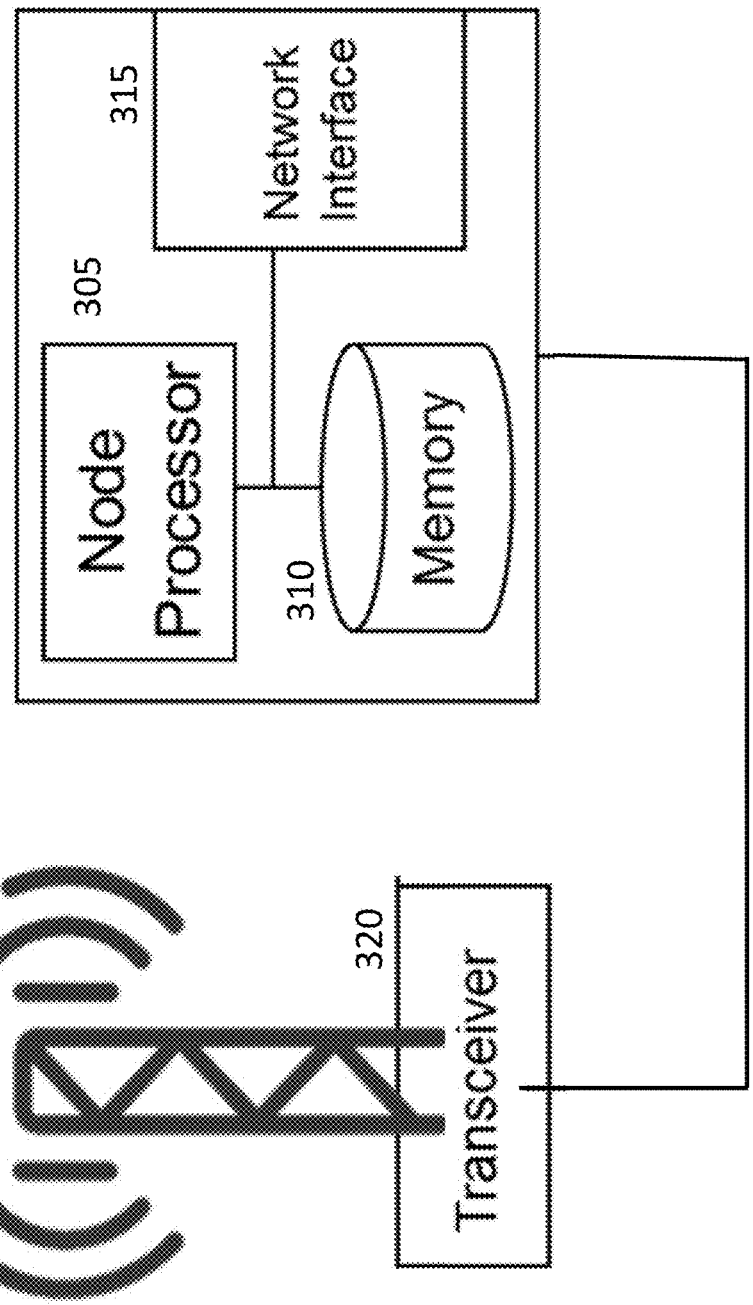
FIG. 3 is a diagram illustrating a radio access node, in accordance with certain embodiments.

Referring to FIG. 3, a radio access node 300 comprises a node processor 305, a memory 310, a network interface 315, a transceiver 320, and an antenna 325. In certain embodiments, some or all of the functionality described as being provided by a base station, a node B, an enodeB, and/or any other type of network node may be provided by node processor 305 executing instructions stored on a computer-readable medium, such as memory 310 shown in FIG. 3. Alternative embodiments of radio access node 400 may comprise additional components to provide additional functionality, such as the functionality described herein and/or related supporting functionality.

Other types of nodes, such as relays, source nodes, and destination nodes, may be configured with components similar to those of radio access node 300 or wireless communication device 200, as will be apparent to those skilled in the art. Moreover, one or both of radio access node 300 and wireless communication device 200 may be configured to operate as a relay, a source node, or a destination node in certain contexts, as will also be apparent to those skilled in the art.

In the description that follows, certain terms will be used to describe various aspects of the described embodiments, such as the structure, composition, configuration and operation of various components. The interpretation of terms used should take into consideration at least the following.

Terms such as "determining", "calculating", "choosing", "deciding", and so on, denote logical or operational processes for arriving at some form of designated information, action, operation, outcome, etc. They do not, however, restrict the processes to specific forms, such as particular mathematical calculations, decision algorithms, etc. Rather, they are to be interpreted more generally. Additionally, depending on context, the above and other terms could be used interchangeably. For instance, determining may be used in place of calculating, choosing or deciding, and vice versa.

Terms such as "source" and "source node" refer generally to an initial point in some defined path or path segment, such as a transmission route; they do not necessarily denote a point at which transmitted information is originally produced. Similarly, the term "source message" refers to a message transmitted by a "source" or "source node", but does not mean that the message itself was originally produced by the source or source node. Likewise, terms such as "destination" and "destination node" refer generally to an endpoint point in some path or path segment, such as a transmission route; they do not necessarily denote a point at which transmitted information is ultimately consumed.

The term "half-duplex" refers to communication that occurs in one direction at a time, usually by performing transmission and reception in some alternating fashion. Terms such as "half-duplex node", "half-duplex relay", or "half-duplex relay node" all refer to components that can perform half-duplex communication, although they are not necessarily limited to operating only in half-duplex mode. For instance, the term "half-duplex relay node" may refer to a node that is capable of half-duplex or full-duplex communication. The terms "half-duplex relay" and "half-duplex relay node" may be used synonymously.

The terms "odd" and "even", when referring to timing or time related groupings (e.g., "even time slot", "odd time slot", "even-time relay group", "odd-time relay group") are merely intended to make relative distinctions. For example, they may be used to indicate an alternating timing relationship between different features. They do not, however, denote or require a specific odd or even numeric designation of the features, although some embodiments do include even/odd indices for certain time related features.

The term "disposed" or "disposed between", when referring to a node or device in a network, generally refers to an operational configuration of the node rather than a relative physical location, although it is not necessarily limited thereto. For instance, where a relay node is referred to as being "disposed between" a source node and a destination node, the relay node may be operationally configured to convey information between the source node and the destination node, but is not necessarily physically between those nodes.

Recent investigations have demonstrated the practical feasibility of full-duplex relays through the suppression of self-interference in a mixed analog-digital fashion in order to avoid receiver power saturation. The architectures behind these full-duplex relays are based on some form of analog self-interference cancellation, followed by digital self-interference cancellation in the baseband domain. In some of these architectures, the self-interference cancellation in the analog domain is achieved by transmitting with multiple antennas such that the signals transmitted over different antennas superimpose in opposite phases and therefore cancel each other at the receiving antennas.

Building on the idea of using multiple antennas to cope with the isolation of the receiver from the transmitter, we may consider a "distributed version" of such an approach where transmit and receive antennas belong to physically separate nodes. This has the benefit that each of such nodes can operate in half-duplex mode. Furthermore, by allowing a large physical separation between transmitting and receiving nodes, the problem of receiver power saturation is eliminated.

Motivated by the distributed approach, the following description presents a "virtual" full-duplex multi-hop relay transmission scheme for a network comprising half-duplex relays. The term "virtual" in this context indicates that full-duplex functionality is achieved even though the relays are operating in half-duplex mode. The described scheme enables a data source to send a anew message to a destination node in every time slot as if full-duplex relays are used, thereby leading to a higher utilization of the wireless channel (bandwidth). Furthermore, for such virtual full-duplex multi-hop relay scheme, an adaptive encoding scheme is presented that achieves high rate performance and outperforms other existing encoding schemes.

Figure 4:
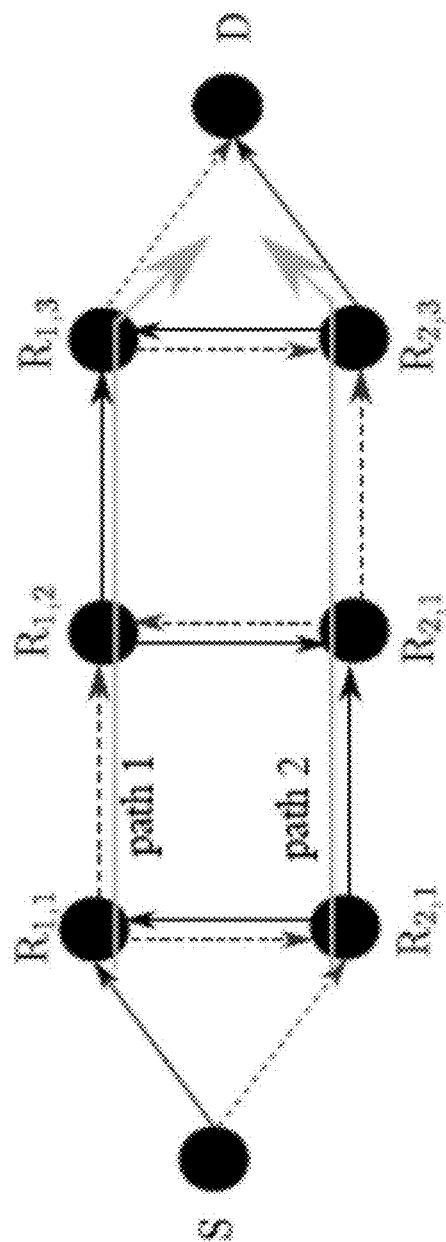
FIG. 4 is a diagram illustrating a communication scheme in which the functionality of a full-duplex relay is achieved by two half-duplex relays operating in tandem, in accordance with certain embodiments

FIG. 4 is a diagram illustrating a communication scheme in which the functionality of a full-duplex relay is achieved by two half-duplex relays operating in tandem. This virtual full-duplex multi-hop relay transmission scheme involves a number of relay stages (K=3 stages in this example, for a 4-hop relay network). In FIG. 4, black-solid lines are active for every odd time slot and dashed lines are active for every even time slot.

Each relay stage (or transmission hop) comprises at least two half-duplex relays, used alternatively in transmit and receive modes, such that while one relay transmits its signal to the next stage, another relay in the same relay stage receives a signal from the previous stage. For example, in FIG. 4 two half-duplex relays $R_{1,1}$ and $R_{2,1}$ collectively form a relay stage. For convenience, relays within the same stage will be referred to as "companion" relays. Accordingly, in the above example half-duplex relays $R_{1,1}$ and $R_{2,1}$ are considered to be companion relays with respect to each other.

The role of the relays in each stage is swapped at each time interval. All relays together typically form two (or more) routes of equal number of hops or stages from the source node to the destination node. In this manner, the source can send a new message to the destination at every time slot as if full-duplex relays are used. Every pair of consecutive source messages will travel via two alternate disjoint paths of relays.

In the following description, an encoding scheme is described that defines encoding/decoding at every node for a network such as that illustrated in FIG. 4. The scheme is characterized by 1) being adaptive in the sense that relays are not confined to performing all the same encoding scheme. Instead, each relay can choose the encoding scheme between decode-and-forward (DF) scheme in which the relay decodes the message before sending, and quantize-map-and-forward (QMF) scheme in which the relay quantizes the message before forwarding. The choice of the scheme is typically based on relay channel conditions as to achieve some performance objective, such as maximizing overall rate performance. The scheme is further characterized by 2) being adaptive in determining whether to perform rate-splitting—a mechanism that allows interference cancellation in the network; 3) being adaptive in the selection of quantization levels at QMF relays to control the tradeoff between the amount of generated information and the associated distortion or quantization noise added to the original signal received at the relay; and 4) decoding of all relay messages (not only the source message) at the destination node.

The approach described herein can be used in any network scenario in which data is sent through relays (full or half-duplex; with or without multiple antennas). Therefore, it applies to wireless networks in general, and also to particular applications such as multi-hop backhaul, network-assisted D2D communications, cellular networks with relays, etc.

This description presents a "virtual" full-duplex relay scheme comprising a sequence of relay stages each containing at least a pair of half-duplex relays working in tandem. In this configuration, at any given time, some of the relays in any relay stage transmit signals while the rest of them receive signals from relays in previous relay stages. The role of the relays alternates with each time interval. In this way, the source can send a new message to the destination at every time slot as if full-duplex relays are used. Every two consecutive source messages will travel via two alternate disjoint paths of relays.

More specifically, a sequence of relay stages is first established in the network from a source node to a destination node. Each relay stage comprises two or more half-duplex relay nodes. These relay nodes in each stage are divided into two groups, including an odd-time relay group and an even-time relay group. The odd-time relay group is responsible for relaying messages (or blocks of information bits) (first) transmitted by the source node in odd time slots, while the even-time relay group is responsible for relaying messages (first) transmitted by the source node in even time slots. The source node alternates its transmission of messages to the odd-time relay group and to the even-time relay group in a sequence of time slots. On the other end, the destination node alternates its reception of signals from the odd-time relay group and from the even-time relay group.

For example, consider a virtual full-duplex relay channel with K relay stages, each comprising only two half-duplex relays, as shown in FIG. 4 with K=3. Notably, one can generalize to a case with more than two relays in each relay stage. Encoding/decoding operations are performed over time slots comprising "n" channel uses of a discrete memoryless channel. Successive relaying is assumed such that, at each time slot "t", the source transmits a new message (i.e. block of information bits) $w_t \in \{1,2,\ldots,2^{nr_i}\}$ where i=1 for odd time slot t and i=2 for even time slot t, and the destination decodes a new message $w_{t-K}$. We define two message rates $r_1$ and $r_2$ since the odd-indexed and even-indexed messages are conveyed to the destination via two disjoint paths such as path 1: $(S, R_{1,1}, R_{1,2}, \ldots, R_{1,K}, D)$ and path 2: $(S, R_{2,1}, R_{2,2}, \ldots, R_{2,K}, D)$. The role of relays is alternately reversed in successive time slots (see FIG. 4). During N+K time slots, the destination decodes the N=2 messages from each path. Thus, the achievable rate of the messages via path "i" is defined by $r_i N/(2(N+K))$. When the number of blocks N becomes very large, the rate $r_i/2$ is achievable arbitrarily closely. Note that the coding rates, namely $r_1$ and $r_2$, of the two paths may be different, and thus the messages (or blocks of information bits) may need to be encoded differently at odd and even time instances.

Figure 5:
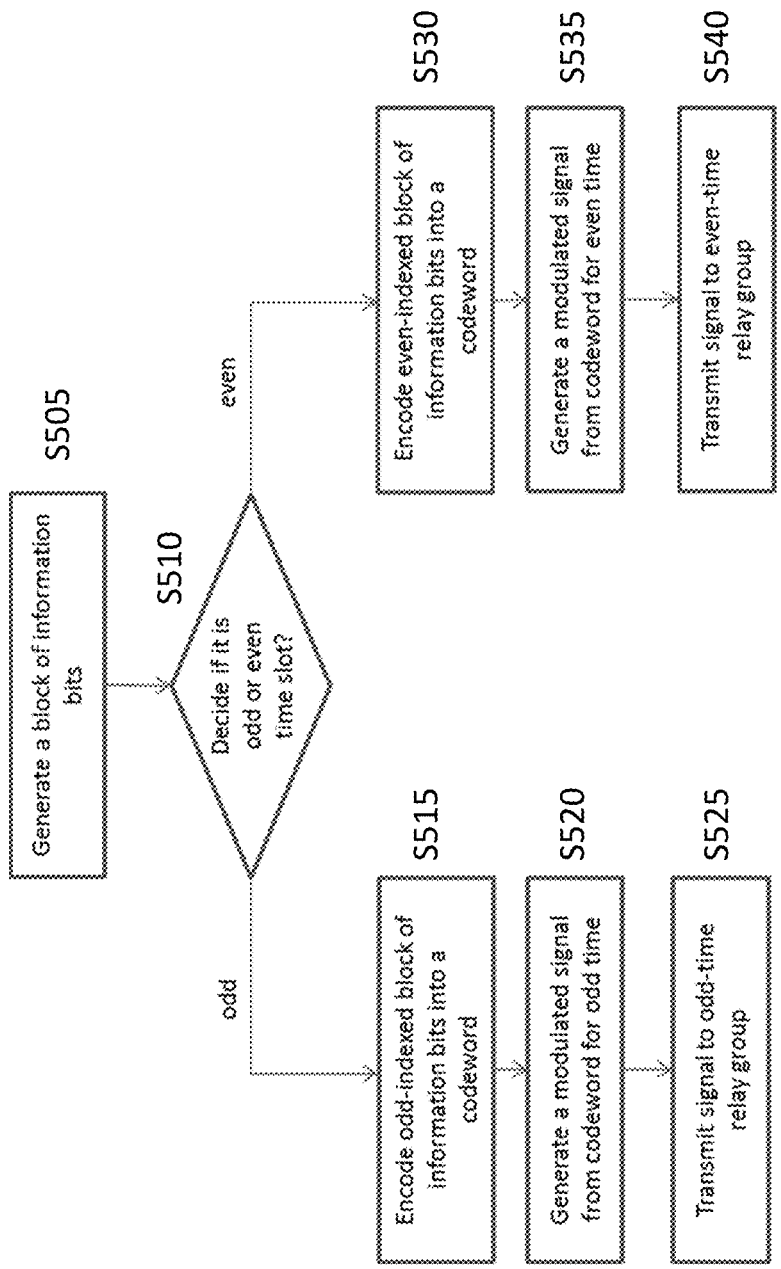
FIG. 5 is a flowchart illustrating operations performed by a source node, in accordance with certain embodiments.

FIG. 5 is a flowchart illustrating a method of operating a source node according to an embodiment of the disclosed subject matter. This method could be performed, for instance, by a system such as that illustrated in FIG. 4. The functions shown in FIG. 5 are typically performed in each time slot. For instance, in each time slot a new block of information bits is typically generated, encoded, modulated and transmitted to a relay group.

Referring to FIG. 5, the method generates a block of information bits (or "message") (S505), and decides (or "determines") whether a transmission time slot for the block of information bits is an odd or even time slot (S510). Upon determining that the transmission time slot is an odd time slot (S510=odd), the method encodes an odd-indexed block of information bits into a codeword (S515), generates a modulated signal from the codeword for the odd time slot (S520), and transmits the modulated signal to an odd-time relay group (S525). Alternatively, upon determining that the transmission time slot is an even time slot (S510=even), the method encodes an even-indexed block of information bits into a codeword (S530), generates a modulated signal from the codeword for the even time slot (S535), and transmits the modulated signal to an even-time relay group (S540). Messages may optionally be encoded with different rates $r_1$ and $r_2$ in respective even and odd time slots.

Figure 6:
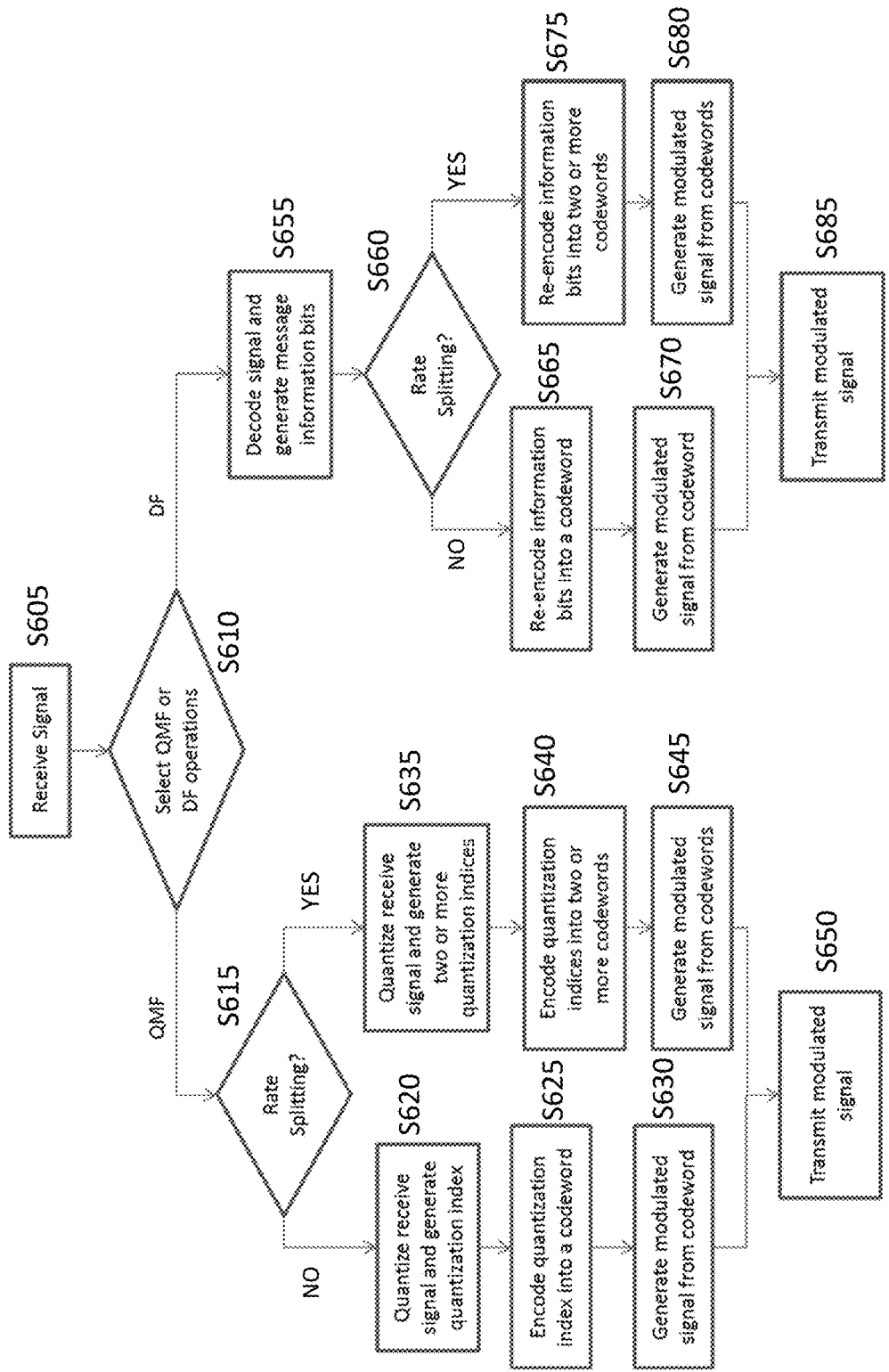
FIG. 6 is a flowchart illustrating operations performed by half-duplex relay nodes in a communication scheme such as that illustrated in FIG. 4, in accordance with certain embodiments.

FIG. 6 is a flowchart illustrating operations performed by each half-duplex relay node. These operations could be performed, for instance, by source node S in the system of FIG. 4.

Referring to FIG. 6, after receiving a signal (S605) from a relay or a group of relays in a previous relay stage in a time slot (odd or even), the relay first adaptively decides whether to perform decode and forward (DF) operations or quantize-map-and-forward (QMF) operations (S610). Such decision may depend adaptively on certain channel quality indicator between the current relay stage and the previous relay stage. If the channel quality is good, DF is used; otherwise QMF is used. For example, DF may be used when the received signal-to-interference-plus-noise ratio (SINR) is higher than a certain (pre-determined) threshold. Otherwise, QMF is used since SINR is not high enough to reliably decode an incoming message.

Where QMF is selected (S610=QMF), the relay would then decide whether to perform rate-splitting to generate two or more codewords to represent the quantized received signal (S615). If rate splitting is to be performed (S615=YES), two or more codewords are generated (S635); otherwise (S615=NO), only one codeword is generated (S620).

The decision of whether to perform rate-splitting may depend on the channel quality between this relay and the relays in the other time group of the same relay stage. Where the channel quality is good, the transmission from this relay can severely interfere with the reception of those relays in the other time group which are receiving. In this case, rate-splitting may be used by this relay to allow those relays in the other time group to perform partial interference cancellation to reduce interference by decoding one of the plurality of codewords. The decision on whether to perform rate-splitting or not may also depend on the choices of operations (DF or QMF) made by the other relays in the same relay stage. Where none of the other relays in the other time group of the same relay stage selects DF, the relay may not perform rate splitting, in which case only one codeword is generated to represent the quantized received signal.

Similarly if DF is selected instead of QMF (S610=DF), the relay first decodes a message (or block of information bits) from the received signal (S655). Then the relay again decides whether to perform rate-splitting to generate two or more codewords to represent the decoded message or simply generate only one codeword (S660). If rate splitting is to be performed (S660=YES), two or more codewords are generated (S675); otherwise (S660=NO), only one codeword is generated (S665).

The decision of whether to perform rate-splitting again may depend on the channel quality between this relay and the relays in the other time group of the same relay stage. Where the channel quality is good, the transmission from this relay can severely interfere with the reception of those relays in the other time group which are receiving. In this case, rate-splitting may be used to allow those relays in the other time group to perform partial interference cancellation to reduce interference by decoding one of the plurality of codewords. The decision on whether to perform rate-splitting or not may also depend on the choices of operations (DF or QMF) made by the other relays that are receiving. Where none of the other relays in the other time group of the same relay stage selects DF, the relay may not perform rate splitting, in which case only one codeword is generated to represent the decoded message (or block of information bits).

After encoding (S625, S640, S665, S675) and modulating (S630, S645, S670, S680) the one or more codewords as illustrated in FIG. 6, the modulated signal is transmitted to the next relay stage or to the destination if the relay is in the last relay stage (S650, S685).

In the proposed method, the destination node is typically aware of relays' operations for decoding while relays do not necessarily know other relays' operations. The relays (in the network) may send information indicating their operational methods to the destination node via a feedback (or signaling) channel. In addition, as in many communication systems, each relay (or receiver) typically knows the code rate of incoming messages.

Figure 7:
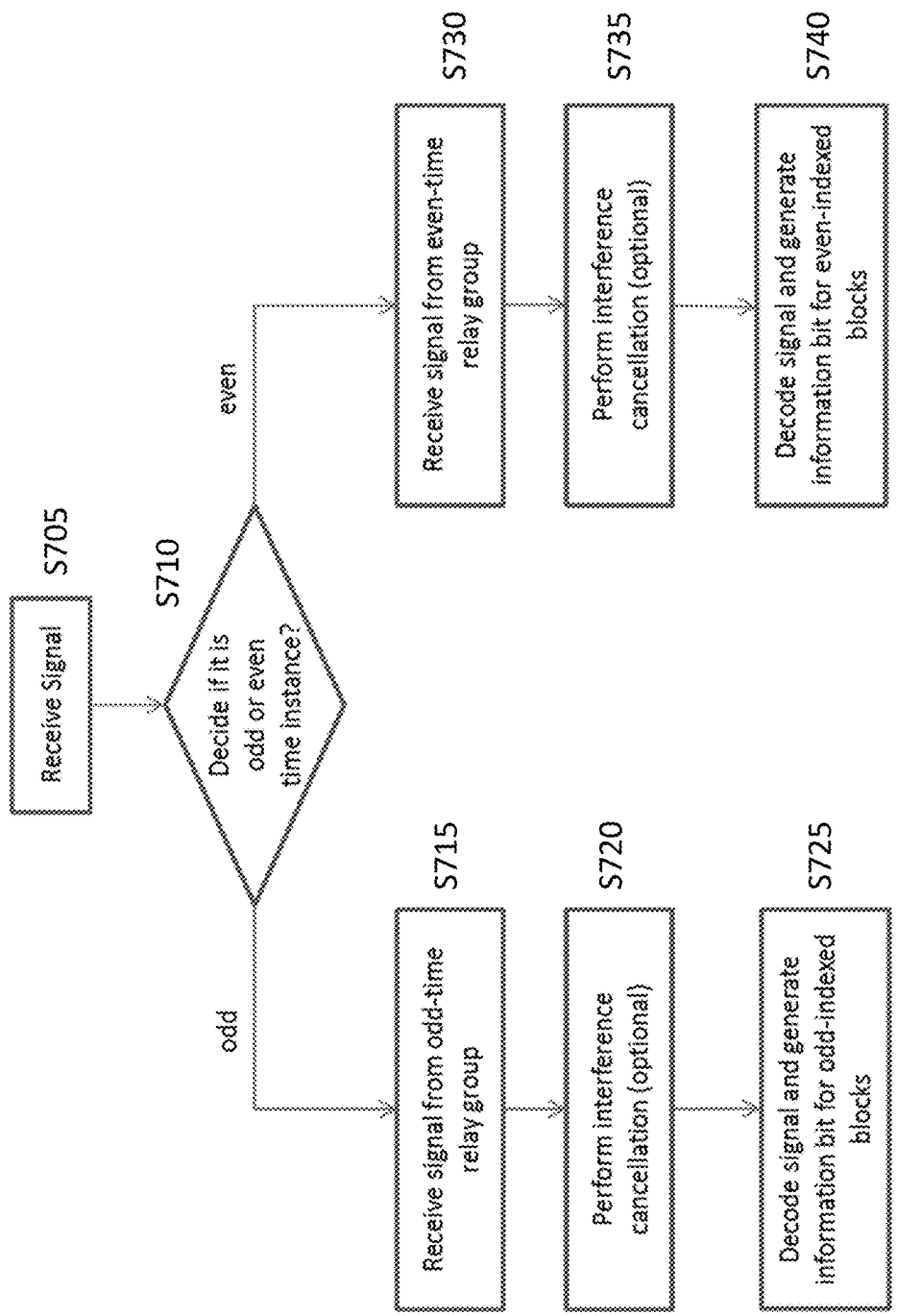
FIG. 7 is a flowchart illustrating operations performed by a destination node in a communication scheme such as that illustrated in FIG. 4, in accordance with certain embodiments.

FIG. 7 is a flowchart illustrating operations performed by the destination node. These operations could be performed, for instance, by destination node D in the system of FIG. 4.

Referring to FIG. 7, in every time slot, a signal is received from the last relay stage (S705). Depending on whether it is odd or even time slot (S710=odd or S710=even), the signal is received from relays in the odd-time relay group or from relays in the even-time relay group (S715 or S730).

Based on the previously decoded message, some interference cancellation operation may be performed on the received signal (S720 or S735). The resulting signal is then used to decode a message (S725 or S740). Depending on whether it is odd or even time slots, the decoding may be done using different decoders of different coding rates ($r_1$ or $r_2$).

Figure 8:
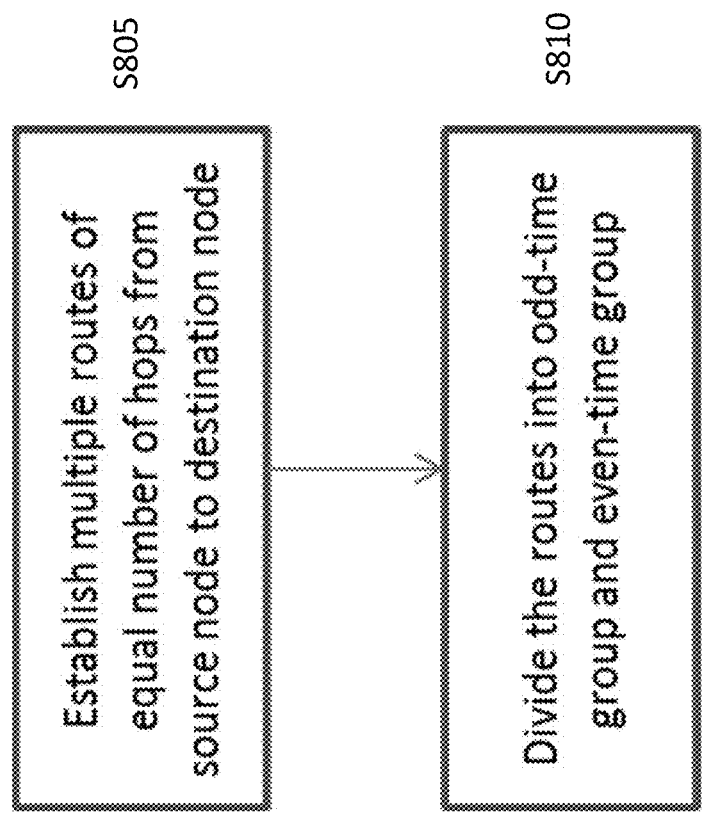
FIG. 8 is a flowchart illustrating network-level operations that determine how a sequence of relay stages may be established in a communication scheme such as that illustrated in FIG. 4, in accordance with certain embodiments.

FIG. 8 is a flowchart illustrating network-level operations that determine how a sequence of relay stages may be established. These operations could be performed, for instance, by one of the nodes illustrated in FIG. 4, or by some other node within a network.

Referring to FIG. 8, first using one or more known routing algorithms, such as the Bellman-Ford algorithm, multiple routes from a source node to a destination node of equal number of hops or stages are found (S805). Then, these routes are divided into two groups, one for carrying messages transmitted by the source node in odd time slots and another for carrying messages transmitted by the source node in even time slots (S810). The term "divide" in this context refers to a logical or operational process of identifying, classifying or designating, nodes as belonging to the respective groups. At each hop or stage, relays belonging to the routes assigned to the odd (or even) time slot are classified as the odd-indexed (or respectively even-indexed) relay group.

The following are selected embodiments in accordance with the disclosed subject matter. These embodiments may be realized, for instance, in the context of systems and methods as described above, or in any of various alternative contexts as will be apparent to those skilled in the art.

In certain embodiments, a wireless communication node comprises a processor and memory collectively encoding instructions that when executed by the processor, cause the wireless communication node to identify a current time slot as an odd time slot or an even time slot, and in response to identifying the current time slot as an odd time slot or an even time slot, transmit a source message to a corresponding odd-time relay group or an even-time relay group during the current time slot, wherein each of the odd-time relay group and the even-time relay group comprises a different set of half-duplex relay nodes disposed between the wireless communication node and a destination node.

In certain related embodiments, the instructions further cause the wireless communication node to generate a block of information bits as the source message, and in response to identifying the current time slot as an odd time slot or an even time slot, encode the block of information bits into a codeword, generate a modulated signal from the codeword, and transmit the modulated signal as the source message. In certain related embodiments, the block of information bits is encoded with a first or second coding rate according to whether the current time slot is an odd time slot or an even time slot. In certain related embodiments, the first and second coding rates are determined according to channel conditions in respective paths through the odd-time relay group and the even-time relay group.

In certain related embodiments, the relay nodes are Long-Term Evolution (LTE) relay nodes. In certain related embodiments, the relay nodes are part of a multi-hop backhaul network.

In certain related embodiments, the relay nodes are device-to-device (D2D) relay nodes.

In certain embodiments, a method of operating a wireless communication node comprises identifying a current time slot as an odd time slot or an even time slot, and in response to identifying the current time slot as an odd time slot or an even time slot, transmitting a source message to a corresponding odd-time relay group or an even-time relay group during the current time slot, wherein each of the odd-time relay group and the even-time relay group comprises a different set of half-duplex relay nodes disposed between the wireless communication node and a destination node.

In certain related embodiments, the method further comprises generating a block of information bits as the source message, and in response to identifying the current time slot as an odd time slot or an even time slot, encoding the block of information bits into a codeword, generating a modulated signal from the codeword, and transmitting the modulated signal as the source message. In certain related embodiments, the method further comprises encoding the block of information bits with a first or second coding rate according to whether the current time slot is an odd time slot or an even time slot. In certain related embodiments, the method further comprises determining the first and second coding rates according to channel conditions in respective paths through the odd-time relay group and the even-time relay group.

In certain embodiments, a wireless communication node comprises a processor and memory collectively encoding instructions that when executed by the processor, cause the wireless communication node to identify a current time slot as an odd time slot or an even time slot, and in response to identifying the current time slot as an odd time slot or an even time slot, receive a source message from a corresponding odd-time relay group or an even-time relay group during the current time slot, wherein each of the odd-time relay group and the even-time relay group comprises a different set of half-duplex relay nodes disposed between the wireless communication node and a source node that produced the source message.

In certain related embodiments, the instructions further cause the wireless communication node to perform interference cancellation on the received source message based on a previously decoded message. In certain related embodiments, the instructions further cause the wireless communication node to decode the received source message to generate information bits for an odd or even indexed block according to whether the current time slot is an odd time slot or an even time slot. In certain related embodiments, the source message is decoded with a first or second coding rate according to whether the current time slot is an odd time slot or an even time slot.

In certain embodiments, a method of operating a wireless communication node comprises identifying a current time slot as an odd time slot or an even time slot, and in response to identifying the current time slot as an odd time slot or an even time slot, receiving a source message from a corresponding odd-time relay group or an even-time relay group during the current time slot, wherein each of the odd-time relay group and the even-time relay group comprises a different set of half-duplex relay nodes disposed between the wireless communication node and a source node that produced the source message.

In certain related embodiments, the method further comprises performing interference cancellation on the received source message based on a previously decoded message. In certain related embodiments, the method further comprises decoding the received source message to generate information bits for an odd or even indexed block according to whether the current time slot is an odd time slot or an even time slot. In certain related embodiments, the source message is decoded with a first or second coding rate according to whether the current time slot is an odd time slot or an even time slot.

In certain embodiments, a half-duplex relay node comprises a processor and memory collectively encoding instructions that when executed by the processor, cause the half-duplex relay node to receive and transmit source messages in alternating receive and transmit time slots, respectively, wherein during each receive time slot, the half-duplex relay node receives a source message output by a source node in an odd time slot, in coordination with a companion half-duplex relay node transmitting a source message output by the source node in an adjacent even time slot, and during each transmit time slot, the half-duplex relay node transmits a source message output by the source node in an odd time slot, in coordination with the companion half-duplex relay node receiving a source message output by the source node in an adjacent even time slot.

In certain related embodiments, the instructions further cause the half-duplex relay node to, for each of the received source messages, adaptively select an encoding scheme and encode the source message according to the selected scheme. In certain related embodiments, adaptively selecting the encoding scheme comprises determining a channel quality value of a relay channel, and selecting one of multiple candidate encoding schemes according to the quality value. In certain related embodiments, the multiple candidate encoding schemes comprise a quantize-map-and-forward (QMF) encoding scheme and a decode-and-forward (DF) encoding scheme. In certain related embodiments, the DF encoding scheme is selected if the channel quality is greater than or equal to a predetermined value, else the QMF encoding scheme is selected.

In certain related embodiments, the selected encoding scheme is the QMF encoding scheme, and the instructions further cause the half-duplex relay node to determine whether to perform rate splitting to generate two or more codewords to represent a received source message. In certain related embodiments, the instructions further cause the half-duplex relay node to, in response to determining to perform rate splitting, quantize the received source message and generate two or more quantization indices, encode the quantization indices into two or more codewords, generate a modulated signal from the two or more codewords, and transmit the modulated signal.

In certain related embodiments, the instructions further cause the half-duplex relay node to, in response to determining not to perform rate splitting, quantize the received source message and generate a single quantization index, encode the quantization index into two or more codewords, generate a modulated signal from the codeword, and transmit the modulated signal.

In certain related embodiments, the selected encoding scheme is the DF encoding scheme, and the instructions further cause the half-duplex relay node to decode a source message to generate message information bits, and thereafter determine whether to perform rate splitting to generate two or more codewords to represent a received source message. In certain related embodiments, the instructions further cause the half-duplex relay node to, in response to determining to perform rate splitting, re-encode the message information bits into two or more codewords, generate a modulated signal from the two or more codewords, and transmit the modulated signal. In certain related embodiments, the instructions further cause the half-duplex relay node to, in response to determining not to perform rate splitting, re-encode the message information bits into a single codeword, generate a modulated signal from the codeword, and transmit the modulated signal.

In certain embodiments, a method of operating a half-duplex relay node comprises receiving and transmitting source messages in alternating receive and transmit time slots, respectively, wherein during each receive time slot, the half-duplex relay node receives a source message output by a source node in an odd time slot, in coordination with a companion half-duplex relay node transmitting a source message output by the source node in an adjacent even time slot, and during each transmit time slot, the half-duplex relay node transmits a source message output by the source node in an odd time slot, in coordination with the companion half-duplex relay node receiving a source message output by the source node in an adjacent even time slot.

In certain related embodiments, the method further comprises, for each of the received source messages, adaptively selecting an encoding scheme and encode the source message according to the selected scheme. In certain related embodiments, adaptively selecting the encoding scheme comprises determining a channel quality value of a relay channel, and selecting one of multiple candidate encoding schemes according to the quality value. In certain related embodiments, the multiple candidate encoding schemes comprise a quantize-map-and-forward (QMF) encoding scheme and a decode-and-forward (DF) encoding scheme. In certain related embodiments, the method further comprises selecting the DF encoding scheme if the channel quality is greater than or equal to a predetermined value, else selecting the QMF encoding scheme.

In certain related embodiments, the selected encoding scheme is the QMF encoding scheme, and the method further comprises determining whether to perform rate splitting to generate two or more codewords to represent a received source message. In certain related embodiments, the method further comprises, in response to determining to performing rate splitting, quantizing the received source message and generate two or more quantization indices, encoding the quantization indices into two or more codewords, generating a modulated signal from the two or more codewords, and transmitting the modulated signal. In certain related embodiments, the method further comprises, in response to determining not to perform rate splitting, quantizing the received source message and generating a single quantization index, encoding the quantization index into two or more codewords, generating a modulated signal from the codeword, and transmitting the modulated signal.

In certain related embodiments, the selected encoding scheme is the DF encoding scheme, and the method further comprises decoding a source message to generate message information bits, and thereafter determining whether to perform rate splitting to generate two or more codewords to represent a received source message. In certain related embodiments, the method further comprises, in response to determining to perform rate splitting, re-encoding the message information bits into two or more codewords, generating a modulated signal from the two or more codewords, and transmitting the modulated signal. In certain related embodiments, the method further comprises, in response to determining not to perform rate splitting, re-encoding the message information bits into a single codeword, generating a modulated signal from the codeword, and transmitting the modulated signal.

In certain related embodiments, a wireless communication system comprises a source node, a destination node, and a plurality of half-duplex relay nodes disposed between the source node and the destination node, wherein the plurality of half-duplex relay nodes are configured in two disjoint paths each comprising an equal number of hops from the source node to the destination node, and wherein the source node is configured to alternately transmit information via the two disjoint paths in alternating time slots.

In certain related embodiments, the source node is further configured to identify a current time slot as an odd time slot or an even time slot, and in response to identifying the current time slot as an odd time slot or an even time slot, transmit a source message to a corresponding odd-time relay group or an even-time relay group during the current time slot, wherein each of the odd-time relay group and the even-time relay group comprises a different subset of the half-duplex relay nodes.

In certain related embodiments, the destination node is configured to identify a current time slot as an odd time slot or an even time slot, and in response to identifying the current time slot as an odd time slot or an even time slot, receiving a source message from a corresponding odd-time relay group or an even-time relay group during the current time slot, wherein each of the odd-time relay group and the even-time relay group comprises a different subset of the half-duplex relay nodes.

In certain embodiments, a method of operating a network comprising a source node, a destination node, and a plurality of half-duplex relay nodes disposed between the source node and the destination node, comprises establishing multiple routes each comprising an equal number of hops from the source node to the destination node and each comprising a different subset of the half-duplex relay nodes, dividing the routes into an odd-time relay group and an even-time relay group, and alternately transmitting source messages from the source node through the odd-time relay group and the even-time relay group in successive odd and even time slots.

In certain related embodiments, the system further comprises the source node identifying a current time slot as an odd time slot or an even time slot, and in response to identifying the current time slot as an odd time slot or an even time slot, transmitting a source message to the odd-time relay group or the even-time relay group during the current time slot.

In certain related embodiments, the system further comprises the destination node identifying a current time slot as an odd time slot or an even time slot, and in response to identifying the current time slot as an odd time slot or an even time slot, receiving a source message from the odd-time relay group or the even-time relay group during the current time slot.

As indicated by the foregoing, the described subject matter can substantially improve the data throughput over a single-route routing solution. It can be shown that the achievable data rate of the described embodiments is quite close to a maximum achievable capacity of the underlying mesh relay network.

The following abbreviations are used in this written description.
CF Compress-and-forward
D2D Device-to-Device
DF Decode-and-forward
LTE Long Term Evolution
M2M Machine-to-Machine
MTC Machine Type Communication
NNC Noisy network coding
QMF Quantize-Map-And-Forward
RAT Radio Access Technology
SF Store-and-forward
SNNC Short message NNC
UE User Equipment While the disclosed subject matter has been presented above with reference to various embodiments, it will be understood that various changes in form and details may be made to the described embodiments without departing from the overall scope of the invention.

The invention claimed is:

1. A wireless communication node, comprising:
a processor and memory storing instructions that, when executed by the processor, cause the wireless communication node to:
generate a block of information bits for a source message;
identify a current time slot as an odd time slot or an even time slot; and
in response to identifying the current time slot as an odd time slot or an even time slot, encode the block of information bits into a codeword, generate a modulated signal from the codeword, and transmit the modulated signal as the source message to a corresponding odd-time relay group or even-time relay group during the current time slot,
wherein each of the odd-time relay group and the even-time relay group comprises a different set of half-duplex relay nodes disposed between the wireless communication node and a destination node.

2. The wireless communication node of claim 1, wherein the block of information bits is encoded with a first or second coding rate according to whether the current time slot is an odd time slot or an even time slot.

3. The wireless communication node of claim 2, wherein the first and second coding rates are determined according to channel conditions in respective paths through the odd-time relay group and the even-time relay group.

4. The wireless communication node of claim 1, wherein the relay nodes are Long-Term Evolution (LTE) relay nodes.

5. The wireless communication node of claim 1, wherein the relay nodes are part of a multi-hop backhaul network.

6. The wireless communication node of claim 1, wherein the relay nodes are device-to-device (D2D) relay nodes.

7. A method of operating a wireless communication node, comprising:
identifying a current time slot as an odd time slot or an even time slot;
generating a block of information bits for a source message; and
in response to identifying the current time slot as an odd time slot or an even time slot, encoding the block of information bits into a codeword, generating a modulated signal from the codeword, and transmitting the modulated signal as the source message to a corresponding odd-time relay group or an even-time relay group during the current time slot,
wherein each of the odd-time relay group and the even-time relay group comprises a different set of half-duplex relay nodes disposed between the wireless communication node and a destination node.

8. The method of claim 7, further comprising encoding the block of information bits with a first or second coding rate according to whether the current time slot is an odd time slot or an even time slot.

9. The method of claim 8, further comprising determining the first and second coding rates according to channel conditions in respective paths through the odd-time relay group and the even-time relay group.

10. A wireless communication node, comprising:
a processor and memory storing instructions that, when executed by the processor, cause the wireless communication node to:
identify a current time slot as an odd time slot or an even time slot; and
in response to identifying the current time slot as an odd time slot or an even time slot, receive a source message from a corresponding odd-time relay group or an even-time relay group during the current time slot,
wherein each of the odd-time relay group and the even-time relay group comprises a different set of half-duplex relay nodes disposed between the wireless communication node and a source node that produced the source message, and wherein the source message is decoded with a first or second coding rate according to whether the current time slot is an odd time slot or an even time slot.

11. The wireless communication node of claim 10, wherein the instructions further cause the wireless communication node to perform interference cancellation on the received source message based on a previously decoded message.

12. The wireless communication node of claim 10, wherein the instructions further cause the wireless communication node to decode the received source message to generate information bits for an odd or even indexed block according to whether the current time slot is an odd time slot or an even time slot.

13. A method of operating a wireless communication node, comprising:
- identifying a current time slot as an odd time slot or an even time slot; and
- in response to identifying the current time slot as an odd time slot or an even time slot, receiving a source message from a corresponding odd-time relay group or an even-time relay group during the current time slot, wherein each of the odd-time relay group and the even-time relay group comprises a different set of half-duplex relay nodes disposed between the wireless communication node and a source node that produced the source message, and wherein the source message is decoded with a first or second coding rate according to whether the current time slot is an odd time slot or an even time slot.

14. The method of claim 13, further comprising performing interference cancellation on the received source message based on a previously decoded message.

15. The method of claim 13, further comprising decoding the received source message to generate information bits for an odd or even indexed block according to whether the current time slot is an odd time slot or an even time slot.

* * * * *